Patented Apr. 29, 1952

2,594,825

UNITED STATES PATENT OFFICE 2,594,825

INTERPOLYMERS OF SELECTED POLY-(2-ALKENOXYALKYL) ESTERS OF FUMARIC ACID AND SELECTED 2-ALKENYL COMPOUNDS

Pliny O. Tawney, Passaic, N. J., assignor to United States Rubber Company, New York, N. Y., a corporation of New Jersey No Drawing. Application November 13, 1947, Serial No. 785,830

5 Claims. (Cl. 260—78.5)

My invention relates to a method for preparing a new class of soluble, unsaturated resins which can be readily converted to insoluble, heat-resistant products by further polymerization at moderate temperatures and in the presence or absence of oxygen. More specifically, my invention concerns the preparation of new, soluble, air-drying resins from selected poly-2-alkenoxyalkyl esters of polycarboxylic acids, as well as from mixtures thereof with copolymerizable monoolefinic compounds, by interpolymerization with selected 2-alkenyl alcohols, 2-alkenyl chlorides, 2-alkenyl alcohol monoethers of saturated alcohols or 2-alkenyl alcohol monoesters of saturated acids.

Prior to the present invention, the polymerization and copolymerizations of the abovementioned type of poly-2-alkenoxyalkyl ester were known to yield insoluble gels before more than a minor amount of the poly-2-alkenoxyalkyl ester had been converted to the polymeric form. The resulting intractable heterogeneous mixture of gel, unreacted monomer and low molecular weight polymers is of little or no commercial utility. Through my discovery of the unique interpolymerization with 2-alkenyl alcohols, chlorides, ethers and esters, however, it is now possible to convert the major proportion of the poly-2-alkenoxyalkyl esters to the soluble, polymeric form without danger of gelation. Moreover, the resulting soluble, unsaturated products can be easily converted to a solvent- and heat-resistant form by further polymerization which, surprisingly, can be effected at room temperature, i. e., ca. 25° C., and in the presence of oxygen, even though the latter has been generally regarded as an inhibitor in the curing of many unsaturated synthetic resins.

The copolymerizable 2-alkenyl alcohols, chlorides, ethers and acyl (monocarboxylic acid) esters which are used in my invention can be any compounds selected from the group consisting of $RCH=CH-CH_2X$ and $CH_2=C(R)-CH_2X$, where R is selected from the group consisting of hydrogen, chlorine, methyl, chloromethyl and ethyl and where X is a radical selected from the group consisting of hydroxyl; chlorine; alkoxy, e. g., methoxy, ethoxy, propoxy, isopropoxy, n-butoxy, isobutoxy, amyloxy, hexoxy, heptoxy, octoxy, nonoxy; hydroxyalkoxy, e. g., β-hydroxyethoxy; cycloalkoxy; aryloxy, e. g., phenoxy, tolyoxy; aralkoxy, e. g., benzyloxy; and acyloxy, e. g., acetoxy, propionoxy, isobutyroxy, valeroxy, benzoyloxy. Illustrative of such compounds are allyl chloride, methallyl chloride, crotyl chloride, 1,3-dichloropropene, 2,3-dichloropropene, 1,4-dichlorobutene-2, 2-(chloromethyl)allyl chloride, allyl alcohol, methallyl alcohol, 2-chloroallyl alcohol, crotyl alcohol, 2-ethylallyl alcohol, allyl methyl ether, methallyl ethyl ether, β-allyloxyethanol, allyl propyl ether, methallyl butyl ether, methallyl amyl ether, methallyl heptyl ether, allyl octyl ether, crotyl ethyl ether, 2-chlorallyl ethyl ether, methallyl phenyl ether, allyl benzyl ether, allyl acetate, allyl chloracetate, 2-chlorallyl propionate, methallyl butyrate, and ethylallyl valerate.

The 2-alkenyl compounds which are interpolymerized with the poly-2-alkenoxyalkyl esters in accordance with my invention are those wherein the 2-alkenyl group is selected from the class consisting of the unsubstituted allyl radical and the allyl radical which is substituted in either the 2- or the 3- position (but not in both) with chlorine, methyl, chloromethyl or ethyl. Thus the class of 2-alkenyl groups used includes only allyl, 2-chloroallyl, 3-chloroallyl, methallyl, crotyl, 2-chloromethyl allyl, 3-choromethyl allyl, 2-ethylallyl and 3-ethylallyl radicals.

Were X in the above formulae is hydroxyl the 2-alkenyl compound is an allyl-type alcohol. Similarly where X is chlorine the compound is an allyl-type chloride.

Where X is an alkoxy, cycloalkoxy, aryloxy or aralkoxy group, the 2-alkenyl compound is an ether. The group, other than 2-alkenyl, attached to the ether oxygen atom may be any alkyl group, cycloalkyl group, aryl group or aralkyl group. The alkyl group may be unsubstituted or may be substituted with a hydroxyl group.

Where X is an acyloxy group, the 2-alkenyl compound is an acyl ester. Any acyl group may be attached to the oxygen to which the 2-alkenyl group is connected, preference being given to acyl groups derived from saturated monocarboxylic acids, i. e., the fatty acids.

Among the above-mentioned types I have found the 2-alkenyl alcohols and the 2-alkenyl chlorides to be the most effective in repressing gelation of a polymerizing poly-2-alkenoxyalkyl ester or of mixtures thereof with various copolymerizable monoolefinic compounds. The resulting interpolymers of the 2-alkenyl alcohols are especially advantageous in regard to the rapidity and completeness with which they can be cured to solvent and heat-resistant products. The corresponding interpolymers of the 2-alkenyl chlorides are particularly useful where products of decreased flammability are desired although such materials are somewhat inferior to the interpolymers of the 2-alkenyl alcohols, ethers and carboxylic acid esters in regard to their resistance to discoloration at high temperatures. For optimum resistance to wetting and attack by hydrophilic solvents, the interpolymers of the 2-alkenyl ethers of saturated monohydric alcohols are preferred although in many cases the interpolymers of the 2-alkenyl esters of saturated monocarboxylic acids have proven nearly equivalent in this respect. Both the 2-alkenyl ethers and carboxylic esters are likewise useful in endowing the resulting copolymers with improved flexibility and this effect can be enhanced by the use of the 2-alkenyl ethers and esters of long chain alcohols and carboxylic acids respectively.

I have found that in the practice of my invention the presence of as little as 0.2 of a mole of the 2-alkenyl alcohol, chloride, ether or ester per mole of the poly-2-alkenoxyalkyl ester is sufficient to secure an increased conversion of the latter monomer to the soluble polymeric form. As the proportion of the 2-alkenyl alcohol, chloride, ether or ester in the initial reaction mixture is increased, the proportion of the poly-2-alkenoxyalkyl ester converted to the soluble polymeric form is likewise increased and optimum yields of soluble, unsaturated polymeric material can be obtained from reaction mixtures initially containing as much as 9.0 moles of the 2-alkenyl alcohol, chloride, ether or ester per mole of the poly-2-alkenoxyalkyl ester.

The proportion of the 2-alkenyl compound employed in the present invention will vary widely depending upon the particular poly-2-alkenoxyalkyl ester employed and even more upon the particular 2-alkenyl compound used. Therefore it is not possible to specify with exactness the proportion required to effect conversion of a major proportion of the ester to the soluble, polymeric form. It will seldom be desirable to use a proportion outside the range of 0.2 to 5 moles of 2-alkenyl compound per mole of the poly-2-alkenoxyalkyl ester. The use of less than 0.2 mole of the 2-alkenyl compound per mole of the ester will seldom lead to any useful result and the use of more than 5 moles per mole of the ester will not give sufficient advantage to be economically feasible. In many cases it will be desirable to use a ratio of at least 1 mole of the 2-alkenyl compound per mole of poly-2-alkenoxyalkyl ester.

The poly-2-alkenoxyalkyl esters which are operable in my invention are those derived from saturated and unsaturated polycarboxylic acids, e. g., oxalic, malonic, succinic, glutaric, sebacic, adipic, tricarballylic, phthalic, muconic, dihydromuconic, and aconitic acids. The esters employed almost invariably are the full esters, i. e. those in which all of the carboxylic groups of the polybasic acid are esterified with the 2-alkenoxyalkanol. The preferred group within this class are the poly-2-alkenoxyalkyl esters of the α-ethylenically unsaturated dicarboxylic acids, specifically maleic, fumaric, itaconic, citraconic, and mesaconic acids, which esters are particularly adapted to the process of my invention by virtue of their high degree of reactivity therein and their expeditious conversion to my new soluble, unsaturated interpolymers in high yields. Of the 2-alkenoxyalkanols suitable for the preparation of such esters, the most readily available class are the β-(2-alkenoxy)alkanols selected from the group consisting of

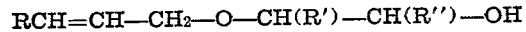

and

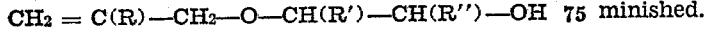

where R, R' and R'' are selected from the group consisting of hydrogen and alkyl, the alkyl group preferably not containing over 3 carbon atoms, i. e., methyl, ethyl and propyl. The preferred group are the di-(β-2-alkenoxyethyl) esters of the α-ethylenically unsaturated dicarboxylic acids mentioned above, such as di-(β-allyloxyethyl) maleate, di-(β-allyloxyethyl) fumarate, di-(β-allyloxyethyl) itaconate, di-(β-2-methallyloxyethyl) maleate, di-(β-allyloxyethyl) mesaconate and di-(β-allyloxyethyl) citraconate.

As previously mentioned, various monoolefinic third copolymerizable compounds can likewise be present in the initial polymerization reaction mixtures along with the poly-2-alkenoxyalkyl esters and the 2-alkenyl alcohols, chlorides, ethers or esters. The inclusion of such third copolymerizable compounds permits numerous variations in the properties of the resulting soluble, unsaturated resins to be attained. Thus, for example, the copolymerization of the poly-2-alkenoxyalkyl ester and a 2-alkenyl alcohol, chloride, ether or ester with an olefine such as styrene, vinyl naphthalene or isobutylene yields resins of improved compatibility with cheap hydrocarbon solvents, an important factor in the formulation of commercial surface coatings. Copolymerization with halogenated monoolefinic compounds as the third ingredient, such as vinyl chloride, vinylidene chloride and the dichlorostyrenes, yields polymeric materials of increased flame-resistance and often of greater hardness. The latter property can also be enhanced by copolymerization with olefinic nitriles, amides and imides, e. g., acrylonitrile and methacrylamide. On the other hand, softer and more flexible products can usually be obtained by copolymerization with olefinic acid esters of non-enic monohydric alcohols as the third ingredient, including the acrylates, methacrylates, maleates, fumarates, itaconates, mesaconates and aconitates, particularly such esters derived from alcohols containing a chain of two or more carbon atoms, e. g., ethanol, n-butanol, 2-ethylhexanol, and octanol.

The above-mentioned types of monoolefinic compounds are exemplary of the general class of third copolymerizable monomers which are operable in my invention and may in part be represented by the type formula $XYC=CHZ$ where (1) Z may be hydrogen, in which case Y is hydrogen, methyl or chlorine and X is one of the substituents aryl, substituted aryl, chlorine, acyloxy, acyl, carbalkoxy, alkoxy, methyl, carbonitrilo, and carboxyl, or Y is carbalkoxymethyl in which case X is then carbalkoxy; or (2) Z may be carbalkoxy, in which case Y is hydrogen, chlorine or methyl and X is carbalkoxy. Illustrative of such compounds are styrene, α-methylstyrene, p-methylstyrene, vinyl chloride, vinylidene chloride, vinyl butyrate, methyl vinyl ketone, n-butyl acrylate, methyl methacrylate, methyl α-chloroacrylate, vinyl n-butyl ether, isopropenyl methyl ether, isobutylene, acrylonitrile, methacrylonitrile, acrylamide, dibutyl fumarate, dimethyl messaconate, dimethyl citraconate, dihexyl itaconate.

The amount of the monoolefinic third copolymerizable compound employed is usually in the range of 0 to 2 moles per mole of the poly-2-alkenoxyalkyl ester. Larger amounts may be used, but in many cases the curing time of the resulting copolymers is prolonged and their valuable air-drying property is markedly diminished.

The interpolymers of my invention are prepared by heating a mixture of the poly-2-alkenoxyalkyl ester and the 2-alkenyl alcohol, chloride, ether or acyl ester in the presence or absence of one or more of the above-mentioned copolymerizable monoolefinic compounds at temperatures in the range of from about 25° to 120° C. and preferably in the range 60–100° C. The interpolymerization reaction is promoted by peroxidic compounds, particularly organic peroxides of the type commonly known to be catalysts for the polymerization of unsaturated materials such as dibenzoyl peroxide, diacetyl peroxide, acetyl benzoyl peroxide, succinyl peroxide and tert.-butyl hydroperoxide, the amounts thereof being usually in the range of from 1.0 to 15.0% and mainly from 1.0 to 5.0% by weight of the mixture of monomeric reactants.

The course of the interpolymerization reaction can be followed by observing the increase in the viscosity of the reaction mixture or by withdrawing samples and determining the amount of interpolymer formed. The interpolymer can be isolated from the reaction mixture by evaporation of the unreacted starting materials or by precipitation with a non-solvent, e. g., n-hexane and diethyl ether. Although unnecessary for most commercial applications, the interpolymers can be further purified by repeated solution in a solvent such as acetone and precipitation with the non-solvent.

For applications in the coatings field my solid interpolymers can be dissolved in appropriate solvents, e. g., xylene. Alternatively, solvents boiling higher than the 2-propenyl alcohol, chloride, ether or ester can be added to the crude interpolymerization reaction mixture which is then partially distilled to remove any unreacted 2-alkenyl alcohol, chloride, ether or ester. The resulting solution is admixed with a catalytic quantity of one of the materials known to the coatings art as "driers," e. g., cobalt naphthenate. Suitable dyes, pigments, fillers and plasticizers may likewise be added if desired. Upon application of such solutions to porous or non-porous surfaces, the coatings become tack-free within a short time, e. g., 2–4 hours, at room temperature and are converted to solvent- and heat-resistant films upon standing for a few additional hours.

This curing process can be accelerated by heating to moderately elevated temperatures, e. g., 50–90° C. The mild conditions under which my interpolymers can be completely cured to solvent- and heat-resistant films render them particularly well adapted for use as wood finishes.

Although my interpolymers possess particular virtue as air-drying coating resins, they may likewise be employed in impregnating, casting and molding operations. Inert addends, i. e., fillers, pigments, etc. such as those mentioned above can be incorporated with the interpolymers with or without the addition of copolymerizable monomeric compounds, e. g., methyl methacrylate, styrene, diethyl fumarate and diallyl fumarate. The resulting compositions can then be converted to an insoluble, substantially infusible state by further polymerization which is promoted by heat and/or polymerization catalysts such as the above-mentioned peroxidic compounds.

The following examples disclose my invention in more detail. All parts are by weight.

EXAMPLE 1

To illustrate my discovery of the effect of interpolymerizable 2-alkenyl alcohols and their chlorides, ethers and esters as previously defined, upon the polymerization of 2-alkenoxyalkyl esters of polycarboxylic acids, mixtures of allyl and allyl-type alcohols, chlorides, ethers and esters in various proportions are heated at 60° C. with β-allyloxyethyl esters of polycarboxylic acids, in the presence of benzoyl peroxide as a polymerization catalyst until the point of incipient gelation is attained in each case. The polymerization reactions are then halted by chilling and the polymeric reaction products are isolated by repeated solution in a solvent such as acetone and precipitation with a non-solvent, e. g., a diethyl ether-hexane mixture, after which the polymers are dried in vacuo to constant weight. The materials, proportions and reaction times are given in Table I below; 100 parts of allyloxyethyl ester being employed in each case.

To more fully illustrate the advantages of my invention the polymerization of the poly-(β-allyloxyethyl) esters in the absence of any copolymerizable allyl-type alcohol or its derivative are also included (I-1, -22, -40, -44) as exemplary of prior art methods.

*Table I*

| No. | Poly-(β-2-alkenoxyalkyl) Esters | 2-alkenyl Alcohols and Derivatives | Parts | Parts Benzoyl Peroxide | Reaction Time (hours) | Parts Soluble Copolymer obtained |
|---|---|---|---|---|---|---|
| 1 | Di-(β-allyloxyethyl) fumarate | -- | 0.00 | 1.0 | 8.3 | [3] 22.8 |
| 2 | ---do--- | Allyl Alcohol | 11.1 | 1.11 | 4.0 | 24.6 |
| 3 | ---do--- | ---do--- | 25.0 | 1.25 | 6.6 | 47.3 |
| 4 | ---do--- | ---do--- | 100.0 | 2.00 | 11.0 | 82.4 |
| 5 | ---do--- | ---do--- | 200.0 | 3.00 | [1] 380.0 | 113.0 |
| 6 | ---do--- | Methallyl Alcohol | 20.0 | 1.2 | 2.5 | 36.6 |
| 7 | ---do--- | ---do--- | 100.0 | 2.0 | 32.3 | 82.2 |
| 8 | ---do--- | Crotyl Alcohol | 30.0 | 1.3 | [1] 23.0 | 34.8 |
| 9 | ---do--- | ---do--- | 100.0 | 2.0 | 80.0 | 61.2 |
| 10 | ---do--- | 2-Allyloxyethanol | 100.0 | 2.0 | 4.6 | 43.5 |
| 11 | ---do--- | ---do--- | 200.0 | 3.0 | 7.7 | 81.2 |
| 12 | ---do--- | Methallyl ethyl ether | 50.0 | 1.5 | 4.4 | 34.2 |
| 13 | ---do--- | ---do--- | 100.0 | 2.0 | [1] 12.2 | 55.3 |
| 14 | ---do--- | ---do--- | 300.0 | 4.0 | 48.2 | 94.5 |
| 15 | ---do--- | Allyl Acetate | 100.0 | 2.0 | 6.8 | 37.4 |
| 16 | ---do--- | ---do--- | 300.0 | 4.0 | 6.2 | 163.4 |
| 17 | ---do--- | Methallyl Chloride | 30.0 | 1.3 | [1] 27.8 | 40.6 |
| 18 | ---do--- | ---do--- | 300.0 | 4.0 | 420.0 | 123.6 |
| 19 | ---do--- | ---do--- | 300.0 | 4.0 | [1,2] 600.0 | 148.6 |
| 20 | ---do--- | 2,3-Dichloropropene | 20.0 | 1.2 | 16.7 | 40.7 |
| 21 | ---do--- | ---do--- | 200.0 | 3.0 | [1] 870.0 | 90.9 |

See footnotes at end of table.

Table I—Continued

| No. | Poly-(β-2-alkenoxyalkyl) Esters | 2-alkenyl Alcohols and Derivatives | Parts | Parts Benzoyl Peroxide | Reaction Time (hours) | Parts Soluble Copolymer obtained |
|---|---|---|---|---|---|---|
| 22 | Di-(β-allyloxyethyl) itaconate. |  | 0.0 | 2.0 | 2.6 | [3] 22.4 |
| 23 | do | Allyl Alcohol | 10.0 | 1.1 | 9.0 | 36.0 |
| 24 | do | do | 20.0 | 1.2 | 54.0 | 51.4 |
| 25 | do | do | 50.0 | 1.5 | [1] 380.0 | 83.8 |
| 26 | do | Methallyl Alcohol | 20.0 | 1.2 | 19.0 | 41.6 |
| 27 | do | do | 100.0 | 2.0 | [1] 430.0 | 80.8 |
| 28 | do | do | 100.0 | 11.0 | 133.0 | 86.9 |
| 29 | do | Crotyl Alcohol | 30.0 | 1.3 | 8.8 | 31.7 |
| 30 | do | do | 100.0 | 2.0 | 15.6 | 59.4 |
| 31 | do | 2-Allyloxyethanol | 100.0 | 2.0 | 10.2 | 60.2 |
| 32 | do | Methallyl ethyl ether. | 20.0 | 1.2 | 8.6 | 28.6 |
| 33 | do | do | 100.0 | 2.0 | 39.2 | 48.6 |
| 34 | do | Allyl Acetate | 100.0 | 2.0 | 21.1 | 50.0 |
| 35 | do | Methallyl Acetate | 50.0 | 1.5 | 18.0 | 40.3 |
| 36 | do | do | 100.0 | 2.0 | 25.0 | 67.2 |
| 37 | do | do | 300.0 | 4.0 | [1] 600.0 | 117.9 |
| 38 | do | Methallyl Chloride. | 20.0 | 1.2 | 17.9 | 40.3 |
| 39 | do | do | 100.0 | 2.0 | [1] 380.0 | 88.8 |
| 40 | Di-(β-allyloxyethyl) Maleate. |  | 0.0 | 3.50 | [1] 33.0 | [3] 25.4 |
| 41 | do | Allyl Alcohol | 100.0 | 12.0 | [1] 29.0 | 49.6 |
| 42 | do | Methallyl Alcohol | 100.0 | 12.0 | 183.0 | 84.7 |
| 43 | do | Crotyl Alcohol | 100.0 | 12.0 | [1] 290.0 | 62.6 |
| 44 | Tri-(β-allyloxyethyl) aconitate. |  | 0.0 | 2.0 | 17.0 | [3] 33.9 |
| 45 | do | Allyl Alcohol | 100.0 | 15.0 | [1] 290.0 | 98.8 |
| 46 | Di-(β-allyloxyethyl) adipate. |  |  | 2.0 | [1] 168.0 | [3] 13.7 |
| 47 | do | Allyl Acetate | 100.0 | 6.0 | [1] 96.0 | 46.6 |

[1] No evidence of incipient gelation.
[2] Reaction carried out at 90° C.
[3] Homopolymer instead of copolymer.

From the above examples it is readily apparent that in the polymerization of a poly-(β-2-alkenoxyalkyl) ester of polycarboxylic acids, the presence of even a small amount of a copolymerizable 2-alkenyl alcohol and/or derivatives thereof, as previously defined, effects a marked increase in the yield of soluble polymeric product. As the amount of the 2-alkenyl alcohol or its derivative present is increased, the amount of the soluble polymeric product obtainable without gelation of the reaction mixture also increases, and in the presence of a sufficient quantity of the copolymerizable 2-alkenyl alcohol or its derivative, the major proportion of the poly-(β-2-alkenoxyalkyl) ester can be converted to a soluble polymeric form without gelation. This is further illustrated by the following example.

EXAMPLE 2

A mixture of 200 parts of di-β-allyloxyethyl itaconate, 200 parts of methallyl chloride and 4.0 parts of benzoyl peroxide is heated at 60° C. for 50 hours without gelation. The reaction mixture is then maintained at this temperature for 300 additional hours without any sign of gelation, after which it is then cooled to 25° C. and the polymeric product is precipitated by the addition of a n-hexane-diethyl ether mixture. After redissolving the polymer and once more precipitating it, the purification is completed by drying to constant weight in vacuo to remove the solvents.

This procedure yields approximately 176 parts of polymeric solid containing 10.57% chlorine which corresponds to a copolymer of approximately 27.2% by weight of methallyl chloride and 72.8% of di-β-allyloxyethyl itaconate. This represents a conversion of approximately 64.0% of the monomeric di-β-allyloxyethyl itaconate to soluble copolymeric form.

EXAMPLE 3

A mixture of 118 parts of di-β-allyloxyethyl fumarate, 480 parts of allyl alcohol and 0.5 part of benzoyl peroxide are heated at reflux for 8 hours during which time 1.5 parts of benzoyl peroxide dissolved in a minimum amount of benzene are added in 3 equal portions. Refluxing is then continued for an additional 12 hours after which the reaction mixture is diluted with about 200 parts of xylene and evacuated at 50–60° C. to remove any unreacted allyl alcohol as an alcohol-xylene azeotrope.

The copolymer is isolated from the reaction mixture by the addition of a 60:40 mixture of n-hexane and diethyl ether, and purification is effected by repeated solution in acetone and precipitation with the hexane-ether mixture after which the product is dried in vacuo to constant weight and amounts to approximately 70.8 parts of polymeric solid.

A varnish is prepared by dissolving 30 parts of the copolymer in 70 parts of a 4:1 mixture of xylene and butanol containing 0.01 part of cobalt in the form of xylene solution of cobalt naphthenate. When spread on wooden panels, the coating becomes tack-free in 2 hours at room temperature and upon standing for an additional 16 hours, even at a relative humidity of 80%, the clear, colorless coating is alcohol-resistant and can be sanded. Upon further standing, the coating becomes resistant to attack by acetone and dilute aqueous alkali.

A similar film on glass is unaffected by 24 hours' immersion in 95% aqueous ethanol and 3 days' immersion in acetone.

An increase in the temperature shortens the curing time of these films. Thus, for example, at 60° C., the films become acetone-resistant in about 3 hours, while only about 30 minutes are required for the cure at 90° C.

EXAMPLE 4

Although the preceding examples have described only the binary interpolymers of poly-(β-2-alkenoxyalkyl) esters with 2-alkenyl alcohols, chlorides, ethers and esters, my invention likewise embraces the interpolymers of the above types of compounds together with one or more monoolefinic third copolymerizable compounds. The preparation of such interpolymers are illustrated in Table II below, the reactions being carried out in the manner of Example 1. One hundred parts of the poly-(β-2-alkenoxyalkyl) ester were employed in every case.

The following example demonstrates that the interpolymerization of a poly-(β-2-alkenoxyalkyl) ester with a 2-alkenyl alcohol, chloride, ether or ester, and a monoolefinic compound as previously defined, yields a soluble convertible polymeric material containing substantial quantities of all three components of the initial reaction mixture.

Table II

| No. | Poly-(β-2-alkenoxyalkyl) Ester | Copolymerizable Monoolefinic Compound | Parts | 2-Alkenyl Alcohols and Derivatives | Parts | Parts Benzoyl Peroxide | Reaction Time (hours) | Parts Soluble Copolymer obtained |
|---|---|---|---|---|---|---|---|---|
| 1 | Di-(β-allyloxyethyl) Fumarate | Diethyl Fumarate | 25 | | | 1.2 | 1.33 | 32.2 |
| 2 | do | do | 25 | Allyl Alcohol | 50 | 2.0 | 5.0 | 69.4 |
| 3 | do | do | 25 | do | 200 | ¹5.0 | ²240.0 | 130.0 |
| 4 | do | do | 50 | do | | 1.5 | 1.85 | 41.3 |
| 5 | do | do | 50 | do | 50 | 2.0 | 6.0 | 61.8 |
| 6 | do | do | 50 | do | 200 | ¹5.0 | ²240.0 | 171.5 |
| 7 | do | do | 25 | Methallyl Chloride | 200 | 4.0 | 87.0 | 75.0 |
| 8 | do | do | 25 | Methallyl ethyl ether | 200 | 4.0 | ²70.0 | 93.6 |
| 9 | do | do | 25 | Allyl Chloracetate | 200 | 3.0 | 3.33 | 54.6 |
| 10 | do | Dimethyl Itaconate | 25 | | | 1.2 | 3.33 | 37.0 |
| 11 | do | do | 25 | Allyl Alcohol | 200 | ¹5.0 | ²240.0 | 171.0 |
| 12 | do | Methyl Acrylate | 25 | | | 1.0 | 0.66 | 41.6 |
| 13 | do | do | 25 | Allyl Alcohol | 200 | 4.0 | ²40.0 | 129.5 |
| 14 | do | do | 25 | | 200 | 4.0 | 3.9 | 37.4 |
| 15 | do | Styrene | 25 | | | 1.0 | 1.9 | 14.1 |
| 16 | do | do | 25 | Allyl Alcohol | 50 | 2.0 | 3.25 | 44.3 |
| 17 | do | do | 25 | do | 200 | 4.0 | 20.25 | 106.0 |
| 18 | do | do | 25 | do | 400 | 6.0 | ²324.0 | 212.5 |
| 19 | do | do | 25 | Allyl Chloride | 200 | 4.0 | 18.33 | 94.0 |
| 20 | do | do | 50 | | | 1.0 | 2.9 | 26.2 |
| 21 | do | do | 50 | Allyl Alcohol | 10 | 1.6 | 3.75 | 45.6 |
| 22 | do | do | 50 | do | 50 | 2.0 | 3.10 | 53.5 |
| 23 | do | do | 50 | do | 100 | 3.0 | 4.8 | 87.5 |
| 24 | do | do | 50 | do | 200 | ¹4.0 | ²120.0 | 129.5 |
| 25 | do | do | 50 | Methallyl Chloride | 200 | 4.0 | ²324.0 | 106.0 |
| 26 | do | do | 50 | Allyl ethyl ether | 300 | 4.0 | ²324.0 | 208.0 |
| 27 | do | do | 50 | Allyl Acetate | 300 | 5.0 | 16.6 | 104.0 |
| 28 | do | do | 100 | | | 4.0 | 1.75 | 48.2 |
| 29 | do | do | 100 | Allyl Alcohol | 100 | 2.0 | 15.5 | 123.6 |
| 30 | do | do | 100 | do | 200 | 5.0 | 23.0 | 211.2 |
| 31 | do | do | 100 | Allyl Chloride | 200 | 4.0 | 18.3 | 115.6 |
| 32 | do | Vinyl n-butyl ether | 50 | | | 1.5 | 0.9 | 18.9 |
| 33 | do | do | 50 | Allyl Alcohol | 100 | 8.0 | ²192.0 | 81.0 |
| 34 | do | Vinyl Acetate | 50 | | | 1.0 | 1.5 | 18.3 |
| 35 | do | do | 50 | Allyl Alcohol | 100 | 5.0 | 11.2 | 96.5 |
| 36 | do | do | 50 | do | 200 | 8.0 | ²192.0 | 103.0 |
| 37 | Di-(β-allyloxyethyl) Itaconate | Styrene | 25 | | | 1.0 | 6.5 | 38.5 |
| 38 | do | do | 25 | Allyl Alcohol | 50 | 4.0 | 13.5 | 76.5 |
| 39 | do | do | 25 | do | 200 | 2.0 | ²324.0 | 117.0 |
| 40 | do | do | 50 | | | 1.0 | 7.0 | 48.6 |
| 41 | do | do | 50 | Allyl Alcohol | 200 | 4.0 | ²324.0 | 146.0 |
| 42 | do | do | 50 | Methallyl Chloride | 300 | 5.0 | ²372.0 | 115.0 |
| 43 | do | do | 50 | Methallyl ethyl ether | 400 | 6.0 | ²372.0 | 209.0 |
| 44 | do | do | 50 | Allyl chloracetate | 400 | 4.0 | ²144.0 | 111.0 |
| 45 | do | Diethyl Fumarate | 25 | | | 1.20 | 5.30 | 33.8 |
| 46 | do | do | 25 | Allyl Alcohol | 50 | 2.0 | ²87.0 | 39.0 |
| 47 | do | do | 25 | do | 200 | 5.0 | ²84.5 | 76.5 |
| 48 | do | Methyl Acrylate | 25 | | | 1.0 | 6.8 | 47.5 |
| 49 | do | do | 25 | Allyl Alcohol | 200 | 4.0 | ²84.5 | 85.0 |
| 50 | Di-(β-allyloxyethyl) Maleate | Styrene | 50 | | | 1.5 | 32.0 | 43.0 |
| 51 | do | do | 50 | Allyl Alcohol | 200 | 2.0 | ²324.0 | 117.0 |
| 52 | do | Diethyl Fumarate | 25 | | | 1.0 | 13.0 | ·59.0 |
| 53 | do | do | 25 | Allyl Alcohol | 200 | 5.0 | ²84.5 | 94.5 |
| 54 | Tri-(β-allyloxyethyl) Aconitate | Methyl Acrylate | 25 | | | 2.0 | 14.5 | 41.6 |
| 55 | do | do | 25 | Allyl Alcohol | 200 | 5.0 | ²84.5 | 80.5 |
| 56 | Di-(β-allyloxyethyl) Phthalate | do | 25 | | | 1.0 | 5.3 | 24.6 |
| 57 | do | do | 25 | Allyl Alcohol | 100 | 5.0 | ²168.0 | 47.8 |
| 58 | do | do | 50 | | | 0.4 | 4.3 | 36.5 |
| 59 | do | do | 50 | Methallyl Chloride | 100 | 8.0 | ²104.0 | 72.0 |
| 60 | do | Diethyl Fumarate | 50 | | | 0.4 | 12.0 | 42.0 |
| 61 | do | do | 50 | Methallyl Alcohol | 100 | 16.0 | ²144.0 | 93.0 |
| 62 | Di-(β-allyloxyethyl) Adipate | do | 50 | | | 2.0 | 11.3 | 59.2 |
| 63 | do | do | 50 | Allyl Alcohol | 200 | 6.0 | ²120.0 | 92.5 |

¹ Add 5.0 more parts of peroxide at the end of 24 hrs.
² No evidence of gelation.

EXAMPLE 5

A mixture of 100 parts of di-(β-allyloxyethyl) fumarate, 25 parts of β-chloroethyl acrylate and 200 parts of allyl alcohol is heated at 60° C. for 72 hours during which time a total of 8.0 parts of dibenzoyl peroxide are added in approximately equal increments at 0, 24 and 48 hours of reaction time. At the end of the reaction, the mixture is cooled and poured into an excess of a 50:50 diethyl ether n-hexane mixture which effects precipitation of the interpolymer. The product is further purified by repeated solution in the minimum quantity of acetone and reprecipitation by the addition of ether-hexane mixture, after which it is dried in vacuo to constant weight to yield 108 parts of a white polymeric solid.

*Analysis.*—Found: Chlorine 2.77%; hydroxyl 3.92%; iodine (Wijs) number, 15.

The chlorine content of the interpolymer is derived from the interpolymerized β-chloroethyl acrylate, the hydroxyl content from the interpolymerized allyl alcohol, and the iodine number indicates the residual unsaturation extant in the interpolymer which is available for further polymerization and which was introduced by the interpolymerized di-(β-allyloxyethyl) fumarate.

EXAMPLE 6

A mixture of 57 parts of di-(β-allyloxyethyl) fumarate, 10.5 parts of styrene, 426 parts of allyl alcohol and 0.75 part of dibenzoyl peroxide is heated at reflux for 20 hours during which time additional increments of 0.75 part of peroxide are added at 3, 6 and 9 hours of reaction time. The reaction mixture is then fractionally distilled to remove the majority of the unreacted allyl alcohol. After approximately 420 mls. of distillate have been collected, 200 mls. of xylene are added to the reaction mixture and distillation is continued until a residue of approximately 92 parts is secured.

Ten parts of this resin are dissolved in a mixture of 4.8 parts of xylene, 1.2 parts of n-butanol and 0.5 part of cyclohexane together with 0.01 part of cobalt in the form of cobalt naphthenate. A glass plate is coated with this solution and baked at 50° C. for approximately 14 hours after which the resulting film is insoluble in acetone and ethanol. A film from the same solution when baked on glass at 90° C. is cured to a hard, clear, solvent-resistant state in 15 minutes. A film deposited on a walnut veneer panel becomes hard and tack-free at 25° C. within a few hours, and is acetone-insoluble within 48 hours at the same temperature.

Having thus described my invention, what I claim and desire to protect by Letters Patent is:

1. An interpolymer of di-(β-allyloxyethyl) fumarate and from 0.2 to 9 moles of allyl alcohol per mole of said fumarate.

2. An interpolymer of di-(β-allyloxyethyl) fumarate and from 0.2 to 9 moles of allyl alcohol per mole of said fumarate, said interpolymer being soluble, unsaturated and convertible to insoluble, heat-resistant form at temperatures as low as room temperature and in the presence or absence of oxygen.

3. The process of making a soluble unsaturated air-drying resin which comprises heating a mixture of (A) di-(beta-allyloxyethyl) fumarate and (B) from 0.2 to 9.0 moles of allyl alcohol per mole of said fumarate, at a temperature in the range of from 25° to 120° C. and in the presence of a peroxidic polymerization catalyst, said heating being continued only so long as there is formed a soluble unsaturated air-drying interpolymer of said fumarate and said alcohol which can be converted to insoluble, heat-resistant form in a thin film by further polymerization at temperatures as low as room temperature in the presence or absence of oxygen, discontinuing said heating while said interpolymer is in the soluble stage, and recovering said soluble interpolymer from the resulting mixture.

4. A soluble unsaturated air-drying interpolymer of (A) di-(beta-allyloxyethyl) fumarate, and (B) from 0.2 to 9.0 moles, per mole of said fumarate, of a compound selected from the group consisting of $$RCH=CH-CH_2X$$

and

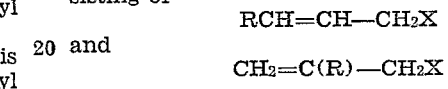

where R is selected from the group consisting of hydrogen, chlorine, methyl, chloromethyl and ethyl and where X is selected from the group consisting of hydroxyl, chlorine, alkoxy, hydroxyalkoxy, aryloxy, aralkoxy and saturated monocarboxylic acyloxy, said interpolymer being soluble, unsaturated and convertible in a thin film to insoluble heat-resistant form at temperatures as low as room temperature and in the presence or absence of oxygen.

5. The process of making a soluble unsaturated air-drying resin which comprises heating a mixture of (A) di-(beta-allyloxyethyl) fumarate and (B) from 0.2 to 9.0 moles, per mole of said fumarate, of a compound selected from the group consisting of $$RCH=CH-CH_2X$$

and

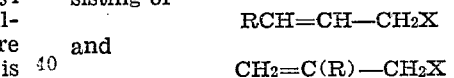

where R is selected from the group consisting of hydrogen, chlorine, methyl, chloromethyl and ethyl and where X is selected from the group consisting of hydroxyl, chlorine, alkoxy, hydroxyalkoxy, aryloxy, aralkoxy and saturated monocarboxylic acyloxy, at a temperature in the range of from 25° to 120° C. and in the presence of a peroxidic polymerization catalyst, said heating being continued only so long as there is formed a soluble unsaturated air-drying interpolymer of said fumarate and said compound which can be converted to insoluble, heat-resistant form in a thin film by further polymerization at temperatures as low as room temperature in the presence or absence of oxygen, discontinuing said heating while said interpolymer is in the soluble stage, and recovering said soluble interpolymer from the resulting mixture.

PLINY O. TAWNEY.

REFERENCES CITED

The following references are of record in the file of this patent:

UNITED STATES PATENTS

| Number | Name | Date |
| --- | --- | --- |
| 2,279,882 | D'Alelio | Apr. 14, 1942 |
| 2,378,195 | D'Alelio | June 12, 1945 |
| 2,498,084 | Kuderna et al. | Feb. 21, 1950 |
| 2,504,052 | Snyder | Apr. 11, 1950 |
| 2,514,786 | Neher et al. | July 11, 1950 |